(12) United States Patent
Dhesikan et al.

(10) Patent No.: US 7,961,715 B1
(45) Date of Patent: Jun. 14, 2011

(54) TECHNIQUE FOR RESERVING RESOURCES FOR AUTHORIZED ENTITIES IN A COMMUNICATION NETWORK

(75) Inventors: Subhasri Dhesikan, San Jose, CA (US); James M. Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 11/323,296

(22) Filed: Dec. 29, 2005

Related U.S. Application Data

(60) Provisional application No. 60/703,922, filed on Jul. 29, 2005.

(51) Int. Cl.
*H04L 12/66* (2006.01)
*H04L 12/28* (2006.01)

(52) U.S. Cl. ............... 370/352; 370/395.2; 370/401; 370/410

(58) Field of Classification Search ............ 370/389, 370/401, 410
See application file for complete search history.

(56) References Cited

U.S. PATENT DOCUMENTS

| | | | |
|---|---|---|---|
| 6,167,445 A | 12/2000 | Gai et al. | |
| 6,286,052 B1 | 9/2001 | McCloghrie et al. | |
| 6,493,317 B1 | 12/2002 | Ma | |
| 6,563,816 B1 | 5/2003 | Nodoushani et al. | |
| 6,584,093 B1 | 6/2003 | Salama et al. | |
| 6,651,101 B1 | 11/2003 | Gai et al. | |
| 6,731,627 B1 | 5/2004 | Gupta et al. | |
| 6,957,071 B1 | 1/2005 | Holur et al. | |
| 6,876,668 B1 | 4/2005 | Chawla et al. | |
| 6,888,808 B2 | 5/2005 | Jagadeesan et al. | |
| 6,915,521 B1 | 7/2005 | Monteiro | |
| 6,931,028 B1 | 8/2005 | Hock | |
| 7,187,671 B2 * | 3/2007 | Moyano et al. | 370/353 |
| 7,369,536 B2 * | 5/2008 | Donovan et al. | 370/352 |
| 2002/0032854 A1 * | 3/2002 | Chen et al. | 713/151 |
| 2002/0062379 A1 * | 5/2002 | Widegren et al. | 709/227 |
| 2004/0010617 A1 * | 1/2004 | Akahane et al. | 709/243 |
| 2004/0205193 A1 * | 10/2004 | Hurtta et al. | 709/227 |
| 2005/0063377 A1 * | 3/2005 | Bryant et al. | 370/389 |
| 2005/0108521 A1 * | 5/2005 | Silhavy et al. | 713/156 |
| 2005/0149754 A1 * | 7/2005 | Rasanen | 713/201 |

OTHER PUBLICATIONS

Marshall, W., "Private Session Initiation Protocol (SIP) Extensions for Media Authorization", RFC 3313, IETF, Jan. 2003, pp. 1-16.*

(Continued)

*Primary Examiner* — Daniel J Ryman
*Assistant Examiner* — Thinh D Tran
(74) *Attorney, Agent, or Firm* — Hamilton, Brook, Smith & Reynolds, P.C.

(57) ABSTRACT

A technique for reserving resources in a communication network for an entity. Communication units in the network register with policy data points (PDPs) to attain authorization to establish and receive calls in a communication network. The PDPs supply the communication units with security tokens that the communication units use to assert that they are authorized to establish sessions and reserve resources in the communication network. Communication units associated with a call include their tokens in signaling messages that are used to establish the call. Nodes along the path between a communication unit associated with a calling party in the call and a communication unit associated with a called party in the call use the tokens to authenticate the source of the signaling messages and determine whether they have permission to reserve resources in the communication network.

8 Claims, 12 Drawing Sheets

OTHER PUBLICATIONS

"End-to-end Quality of Service (QoS) concept and architecture," 3GPP TS 23.207 v5.9.0, 3GPP, Mar. 2004.*

"Bindings and Profiles for the OASIS Security Assertion Markup Language (SAML) V1.1", *Organization for the Advancement of Structured Information Standards(OASIS)*, Sep. 2, 2003, pp. 1-31.

"SAML XPath Attribute Profile", *OASIS*, Jul. 6, 2005, pp. 1-7.

"Conformance Requirements for the OASIS Security Assertion Markup Language (SAML) V2.0", *OASIS*, Mar. 15, 2005, pp. 1-19.

"Glossary for the OASIS Security Assertion Markup Language (SAML) V2.0", *OASIS*, Mar. 15, 2005, pp. 1-16.

"Metadata for the OASIS Security Assertion Markup Language (SAML) V2.0", *OASIS*, Mar. 15, 2005, pp. 1-43.

"Assertions and Protocols for the OASIS Security Assertion Markup Language (SAML) V2.0", OASIS, Mar. 15, 2005, pp. 1-86.

"Profiles for the OASIS Security Assertion Markup Language (SAML) V2.0", *OASIS*, Mar. 15, 2005, pp. 1-66.

Camarillo, G., et al., "Integration of Resource Management and Session Initiation Protocol (SIP)", Request for Comments (RFC) 3312, *Internet Engineering Task Force (IETF)*, Oct. 2002, pp. 1-30.

Herzog, S., "RSVP Extensions for Policy Control", RFC 2750, *IETF*, Jan. 2000, pp. 1-13.

Marshall, W., "Private Session Initiation Protocol (SIP) Extensions for Media Authorization", RFC 3313, *IETF*, Jan. 2003, pp. 1-16.

Shenker, S., et al., "General Characterization Parameters for Integrated Service Network Elements", RFC 2215, *IETF*, Sep. 1997, pp. 1-16.

Braden, R., et al., "Resource Reservation Protocol (RSVP)", RFC 2205, *IETF*, Sep. 1997, pp. 1-112.

Hancock, R., "Next Steps in Signaling (NSIS): Framework", RFC 4080, *IETF*, Jun. 2005, pp. 1-49.

Durham, D., et al., "The COPS (Common Open Policy Service) Protocol", RFC 2748, *IETF*, Jan. 2000, pp. 1-30.

Rosenberg, J., et al., "SIP: Session Initiation Protocol", RFC 3261, *IETF*, Jun. 2002, pp. 1-269.

Peterson, J., et al., "Trait-based Authorization Requirements for the Session Initiation Protocol (SIP)", draft-ietf-sipping-trait-authz-01.txt, *IETF*, Feb. 16, 2005, pp. 1-16.

Tschofenig, H., et al., "Enriching Bootstrapping with Authorization Information", draft-tschofenig-enroll-bootstrapping-saml-00.txt, *IETF*, Feb. 12, 2005, pp. 1-26.

Tschofenig, H., et al., "Using SAML for SIP", draft-tschofenig-sip-saml-03.txt, *IETF*, Jul. 6, 2005, pp. 1-35.

"SAML V2.0 Executive Overview", *OASIS*, Apr. 12, 2005, pp. 1-7.

* cited by examiner

TECHNIQUE FOR RESERVING RESOURCES FOR AUTHORIZED ENTITIES IN A COMMUNICATION NETWORK

RELATED APPLICATION

This application claims the benefit of U.S. Provisional Application No. 60/703,922, filed on Jul. 29, 2005. The entire teachings of the above application are incorporated herein by reference.

FIELD OF THE INVENTION

This invention relates to communication networks and in particular to reserving resources for authorized entities in a communication network.

BACKGROUND OF THE INVENTION

A communication network is a geographically distributed collection of nodes interconnected by communication links and segments for transporting communications (e.g., data) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general physical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Communication units in a communication network typically communicate via one or more intermediate nodes, such as routers, in the network. Routers are often configured to "route" data, such as packets, between various nodes in the network. Routing is typically performed at layer-3 (L3), which is the network layer of the Open Systems Interconnection Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol.

Routing information is typically exchanged between the routers in the form of advertisement messages. For example, nodes executing the IS-IS protocol exchange routing information using an advertisement message called a Link State Packet (LSP). Likewise, nodes executing the OSPF protocol exchange routing information using an advertisement message called a Link State Advertisement (LSA). An intermediate node that acquires an advertisement message may use information contained therein to update its FDB.

Communication networks are increasingly being used to transport many forms of information including, e.g., voice and video information. Information may be carried on a communication network using various technologies, such as Voice over IP (VoIP). VoIP refers to a group of technologies that may be used to transmit e.g., voice information over communication networks from a source (calling party) to a destination (called party). Such networks may include a plurality of agents that convert e.g., voice and/or video information from its traditional form to a form that is suitable for packet transmission. In other words, the agent encodes, compresses and encapsulates the information into a plurality of data packets that are suitable for being carried by the communication network. Examples of agents include IP telephones, VoIP network interfaces, certain private branch exchanges (PBXs), personal computers (PCs) running communication applications, network devices providing voice gateway services and so on.

In some communication networks, such as VoIP networks, a session protocol may be employed to establish a VoIP session (connection) that supports a call between a calling party and a called party. An example of a session protocol that is commonly used is the well-known Session Initiation Protocol (SIP) which is defined in the Internet Engineering Task Force (IETF) Request For Comments (RFC) 3261. SIP operates at the application layer of the OSI-RM and is defined to establish and maintain sessions between endpoints (e.g., SIP-based telephones) in a communication network.

According to SIP, endpoints are referred to as User Agents (UAs). When a UA comes on-line, it typically registers with a registration service, called a policy data point (PDP), using a SIP register command. The PDP maintains information about the UA which may include its location, how to reach it and authentication information associated with the UA that may be used to authenticate the UA. Typically, after a UA is registered, the UA is available to receive as well as initiate calls.

When a call is initiated by a calling party to a called party, a session is typically established between the calling and called parties' UAs to support the call. Establishing a session between the parties typically involves (1) authenticating both parties and (2) successfully exchanging a sequence of messages between the parties in a predetermined manner. Authentication usually involves ensuring the parties have permission to establish a call in the network. The sequence of messages typically include an invite message issued by the calling party, an OK message issued by the called party followed by an acknowledgement (ACK) issued by the calling party. After the session is established, a channel may then be established, e.g., in accordance with the Real-time Transport Protocol (RTP) defined in the IETF RFC 1889, to carry traffic (e.g., voice information) between the parties.

Unlike static data files or records, voice and/or video information tends to be highly sensitive to delayed and lost packets as well as jitter. That is, delays in receiving data packets, the loss of packets and/or inconsistent delivery of packets may seriously degrade the quality of the information as experienced at the called party's agent. Accordingly, packets carrying this information must usually be delivered to the called party with a high probability of success and, in a consistent and timely manner.

Communication networks may incorporate various services and resources to obviate the effects of delayed and lost packets and to ensure consistent, successful and timely delivery of data packets. In particular, an intermediate node (e.g., a router) in the communication network may provide specific resources and/or services that are configured to affect the rate at which traffic moves through the node in an effort to avoid traffic congestion in the network that may lead to lost or delayed traffic. These resources and/or services may include priority queues, filter settings, traffic shapers, queue selection strategies, congestion control algorithms and the like. Depending on the selection or allocation of such resources and services within the network, traffic may be forwarded at different rates and at different priorities in the network in an effort to avoid congestion and, ensure consistent and timely delivery of the traffic.

Some applications may incorporate unidirectional data flows configured to transfer time-sensitive traffic from a source (sender) in a communication network to a destination (receiver) in the network for a particular VoIP session. Here, network resources may be reserved for a unidirectional flow to ensure that a certain "quality of service" (QoS) is maintained for the data flow. QoS relates to the handling of traffic associated with a data flow to ensure that it is consistently and timely delivered. QoS is typically influenced by the amount of resources in a network that are dedicated to providing the delivery of traffic.

The Resource Reservation Protocol (RSVP) is a network-layer protocol that enables applications to reserve resources for data flows in order to obtain a certain QoS for the data flows. RSVP works in conjunction with routing protocols to reserve resources for data flows in a communication network in order to establish a level of QoS required by the data flows. RSVP is described in R. Braden, et al., "Resource ReSerVation Protocol (RSVP)," Request For Comments (RFC) 2205. Pursuant to RSVP, a data flow is a sequence of messages that have the same source address and same destination address (unicast or multicast). Data flows are unidirectional in that data travels on a data flow from a sender to a receiver. An RSVP session is a collection of one or more data flows that have the same unicast or multicast destination address. RSVP sessions typically utilize port and protocol numbers much like data flows. RSVP sessions differ from data flows in that a session may have multiple senders, whereas a data flow only originates from a single sender.

In a protocol such as RSVP, signaling messages are used to reserve resources for data flows. RSVP defines two fundamental types of signaling messages, a RSVP path (Path) message and a RSVP reservation request (Resv) message. Path messages are typically sent by senders to identify them and indicate the resources (e.g., bandwidth) needed to receive their programming or content. These messages proceed hop-by-hop on a path through the communication network to one or more receivers. The Path messages make intermediate nodes on the path aware of the possibility that a reservation of resources may be required. If a receiver is interested in the programming or content offered by a particular sender, it responds with a RSVP Resv message to reserve resources for a data flow between the sender and receiver. The Resv message specifies resources needed to accommodate the data flow. The Resv message travels hop-by-hop on the same path taken by the Path message but in the reverse direction back to the sender. At each hop, the corresponding intermediate node establishes a reservation for the receiver by setting aside (reserving) resources specified in the Resv message for the data flow. These resources are immediately made available to the data flow. If resources are not available, the reservation may be refused explicitly so that the receiver knows it cannot depend on the corresponding resources being devoted to its traffic. By using RSVP, packets carrying, e.g., time-sensitive information can be accorded the resources and services they need to ensure timely delivery.

The RSVP protocol includes error messages that are used to provide information about the status of a reservation. These messages include a path-error message and a reservation-request error message. A path-error message results from a Path message and travels towards the sender that issued the Path message and a reservation-request-error message results from a Resv message and travels towards the receiver that issued the Resv message. The path-error and reservation-request-error messages include information associated with errors due to processing Path and Resv messages, respectively, such as admission failure, bandwidth unavailable, service not supported, bad flow specification, ambiguous path and the like.

Reservation protocols, such as RSVP, often support prioritization and preemption of reservations. Prioritization generally relates to a preference (priority) given to a reservation with respect to allocating resources to the reservation over other reservations. Preemption generally relates to preempting an existing lower priority reservation in order to reallocate its resources to a newer higher-priority reservation.

Typically, a reservation is preempted by: (a) notifying the receiver of the reservation that the reservation is being preempted, (b) tearing down (removing) the reservation and (c) reallocating its resources as necessary to the newer reservation. Any remaining resources from the preempted reservation that were not allocated to the newer reservation are made available for future reservations.

Some prior art systems used to establish calls in a communication network incorporate techniques for performing authorization at the session protocol level to determine if entities participating in a call are authorized to do so. However, these techniques do not necessarily involve performing checks at the reservation protocol level to ensure that an entity requesting to reserve resources is authorized to do so. Thus, it is possible for an unauthorized entity to reserve resources in the network and potentially exclude authorized entities from reserving resources.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

It should be noted that, illustrated embodiments of the present invention, described herein, are described as using the Resource Reservation Protocol (RSVP) to reserve resources in a communication network. RSVP is described in R. Braden, et al., "Resource ReSerVation Protocol (RSVP)," Request For Comments (RFC) 2205, September 1997, available from the Internet Engineering Task Force (IETF) and which is hereby incorporated by reference in its entirety as though fully set forth herein. It should be noted that other protocols that reserve resources in a communication network may take advantage of the present invention, such as the Next Steps in Signaling (NSIS) protocol currently under development by the NSIS Working Group of the IETF. The framework of NSIS is described in R. Hancock et al., "Next Steps in Signaling (NSIS): Framework," RFC 4080, available from the IETF and which is incorporated by reference in its entirety as though fully set forth herein.

The present invention relates to a method for reserving resources in a communication network for an entity that overcomes shortcomings associated with the prior art. According to an aspect of the present invention, communication units register with policy data points (PDPs) to attain authorization to establish and receive calls in the communication network. The PDPs supply the communication units with security tokens that are used by the communication units to assert that they are authorized to establish sessions and reserve resources in the communication network. Communication units associated with a call include their tokens in signaling messages that are used to establish the call. Nodes along a path between communication units in the call use the tokens to authenticate the communication units and determine whether they have permission to reserve resources in the communication network.

Figure 1:
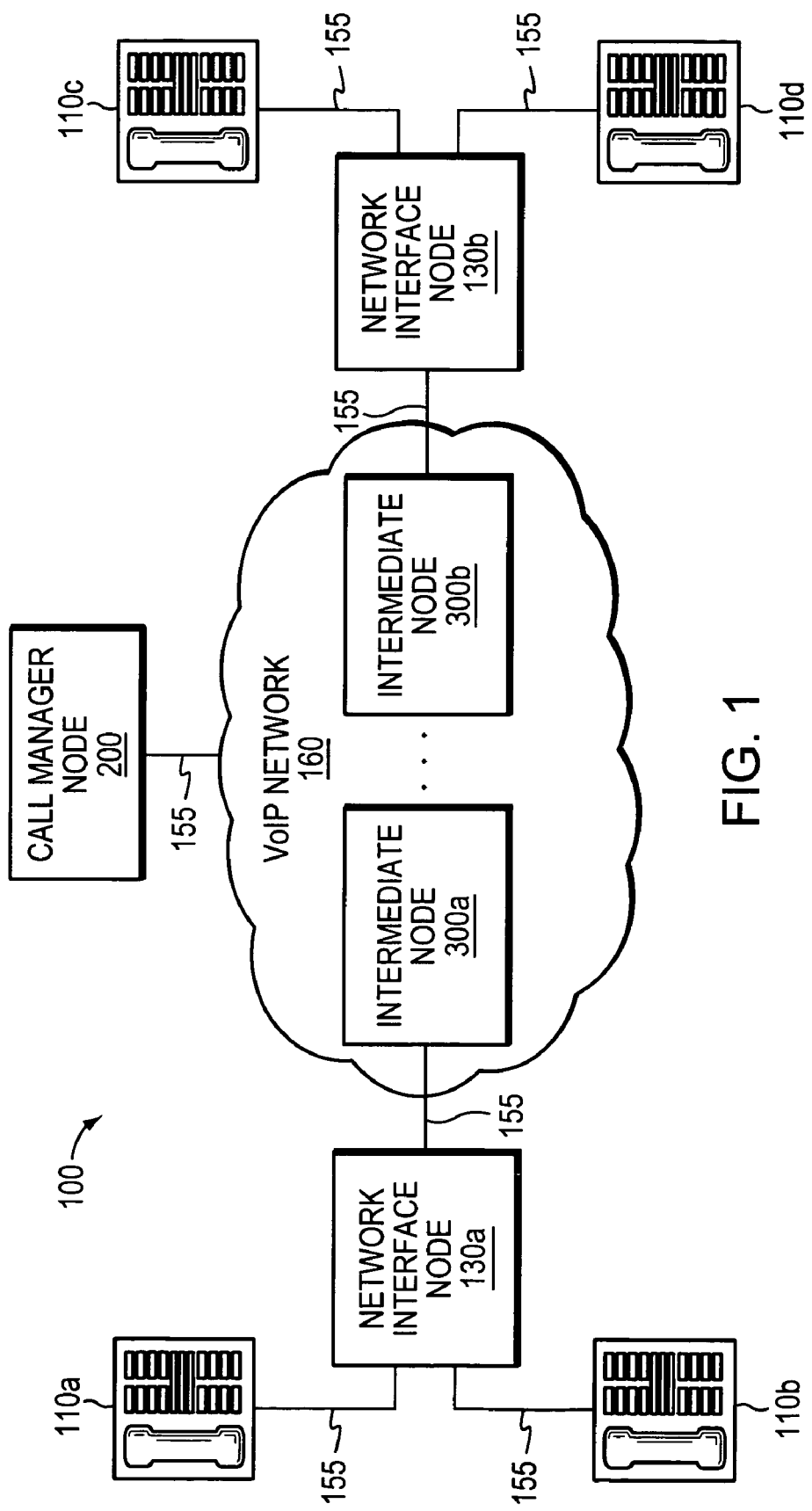
FIG. 1 is a high-level block diagram of an exemplary communication network that may implement the present invention.

FIG. 1 is a high-level block diagram of an exemplary communication network that may implement the present invention. Communication network 100 comprises a collection of communication links 155 interconnecting a plurality of nodes, such as communication units 110, network interface nodes 130, call manager node 200 and intermediate nodes 300, to form an internetwork of nodes. These internetworked nodes communicate by exchanging data packets according to a predefined set of network protocols, such as the Transmission Control Protocol/Internet Protocol (TCP/IP), the Resource Reservation Protocol (RSVP) and the Voice over IP (VoIP) protocol. A network protocol as used herein is a formal set of rules that define how data is exchanged between nodes on a communication network.

Communication units 110 are conventional communication units, such as telephones, personal computers, personal digital assistants (PDAs) and the like, that enable e.g., audible and/or visual communications to be converted into electrical signals that are transferred to the network interface nodes 130. An example of a communication unit that may be used with the present invention is the Cisco 7960 telephone available from Cisco Systems Inc., San Jose, Calif. 95134.

The network interface nodes 130 interface the communication units 110 with the network 100 and enable signals to be transferred between the communication units 110 and the network 100. Specifically, network interface nodes 130 convert electrical signals received from the communication units 130 into data packets that are transferred onto the network 100 as well as convert packets received from the network 100 into electrical signals that are transferred to the communication units 130 for presentation to a user. It should be noted that the present invention may work with other devices, such as personal digital assistants (PDAs), computer systems and media processing devices that enable other forms of communications to be carried on network 100.

Figure 2:
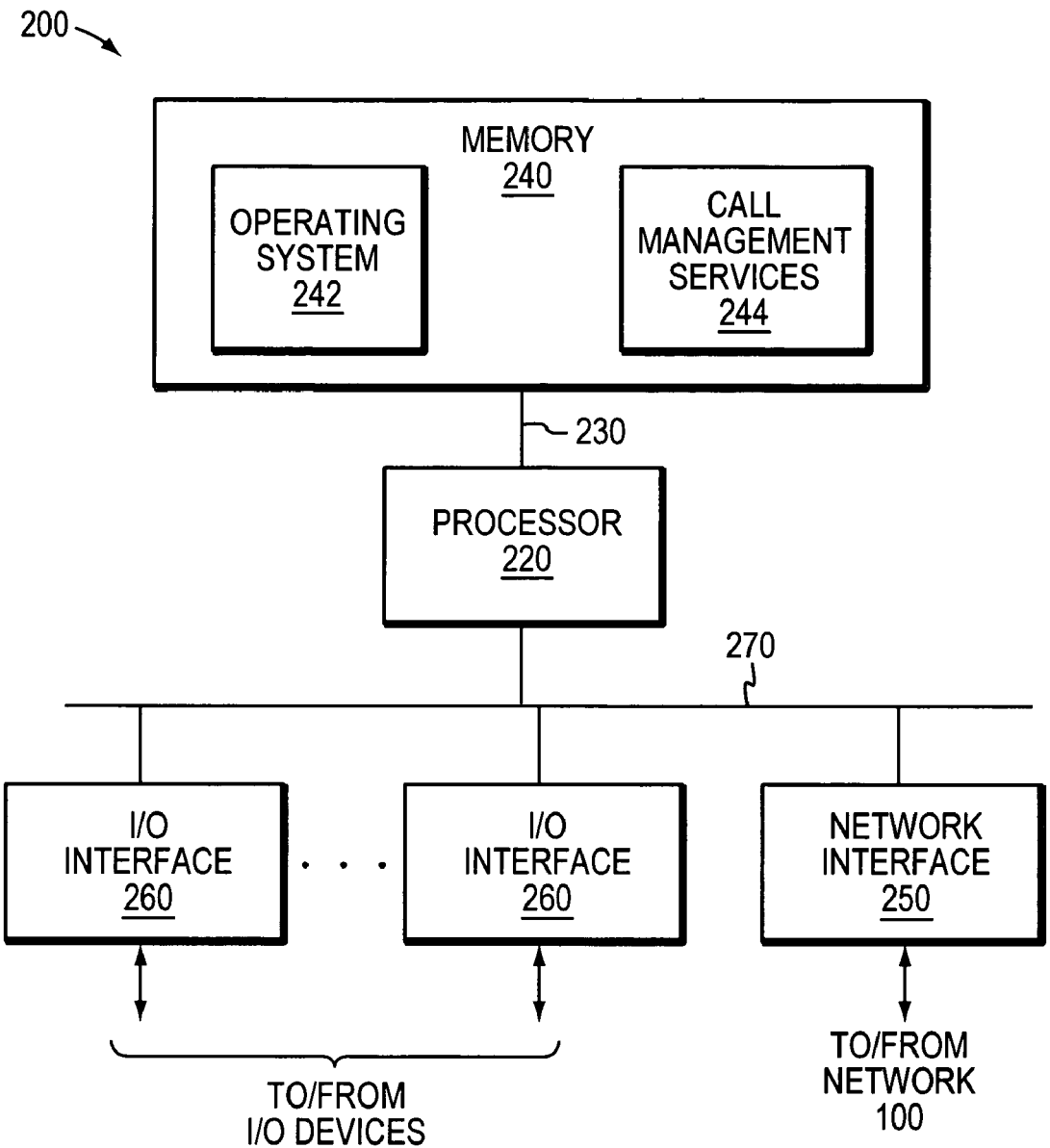
FIG. 2 is a high-level block diagram of a call manager node that may be used with the present invention.

Information (e.g., voice, video) may be conveyed between communication units 110 using calls which are established between the communication units 110. Call manager node 200 is configured to manage calls placed in the network 100 by the communication units 110. FIG. 2 is a high-level block diagram of an exemplary call manager node 200 that may be used with the present invention. Node 200 comprises a processor 220, input/output (I/O) interfaces 260 and a network interface 250 coupled to the processor 220 via an I/O bus 270, and a memory 240 coupled to the processor 220 via a memory bus 230. A suitable call manager node that may be used with the present invention is the Cisco Media Convergence Server (MCS) 7845, available from Cisco Systems Inc.

The processor 220 is a conventional central processing unit (CPU) configured to execute computer-executable instructions contained in memory 240 including instructions that implement aspects of the present invention. The I/O interfaces 260 are conventional I/O device interfaces that interface the processor 220 with various I/O devices, such as display units, keyboards, disk units and the like. The network interface 250 is a conventional network interface (e.g., a network interface card) that interfaces the call manager node 200 with the network 100 and enables information (e.g., data packets) to be transferred between the call manager node 200 and the network 100. To that end, interface 250 comprises conventional interface circuitry that incorporates signal, electrical and mechanical characteristics, and interchange circuits, needed to interface with the physical media of the network 100 and protocols running over that media.

The memory 240 is a computer-readable medium implemented as a random-access memory (RAM) comprising RAM devices, such as dynamic RAM (DRAM) devices. Memory 240 contains various software and data structures used by processor 220 including software and data structures that implement aspects of the present invention.

Specifically, memory 240 contains operating system 242 and call management services 244. Operating system 242 functionally organizes the call manager node 200 by invoking operations in support of software processes and services executing on the call manager, such as call management services 244. Call management services 244 includes functions that implement various protocols for supporting the transfer of information on network 100 in accordance with an aspect of the present invention. These protocols illustratively include the Session Initiation Protocol (SIP) which is described in J. Rosenberg et al., "SIP: Session Initiation Protocol," RFC 3261, June 2002, available from the IETF and is incorporated by reference in its entirety as though fully set forth herein. In addition, as will be described further below, call management services 244 includes services to authenticate entities in the communication network 100 (e.g., communication units 110), provide security tokens to authenticated entities and provide routing information for calls made by the entities.

Figure 3:
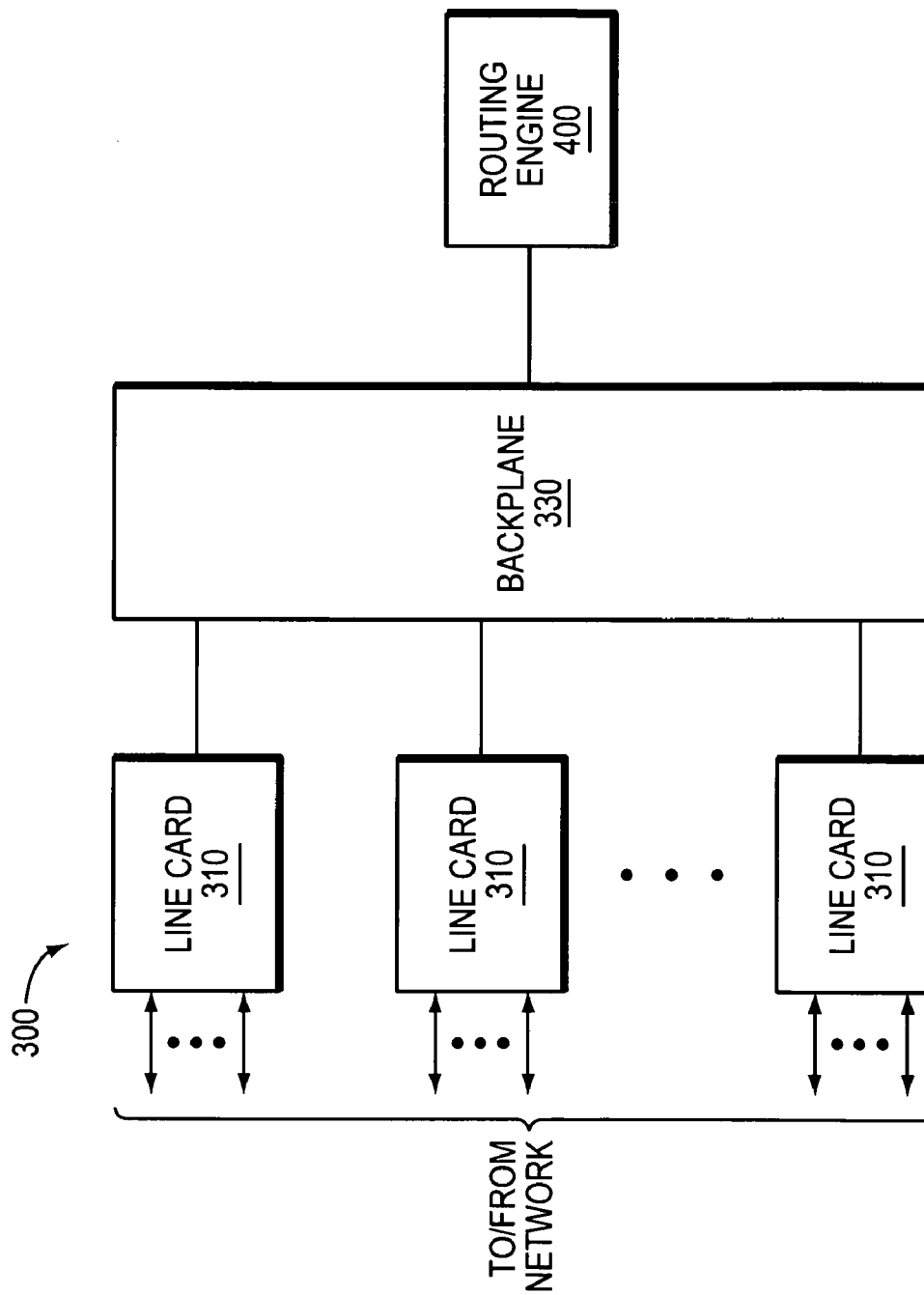
FIG. 3 is a high-level block diagram of an intermediate node that may be used with the present invention.

FIG. 3 is a high-level block diagram of an intermediate node 300 that may be used with the present invention. Intermediate node 300 is illustratively a router comprising one or more line cards 310 and a routing engine card 400 interconnected by a backplane 330. Intermediate node 300 is configured to perform various conventional layer-2 (L2) and layer-3 (L3) switching and routing functions as well as various session initiation and maintenance functions at layer-7 (L7). As used herein, L2, L3 and L7 refer to the data-link layer, network layer and application layer, respectively, of the Open Systems Interconnection Reference Model (OSI-RM). Intermediate node 300 may also be configured to support various combinations of protocols including, e.g., Open Shortest Path First (OSPF), Intermediate-System-to-Intermediate-System (IS-IS), TCP/IP, RSVP, Real-time Transport Protocol (RTP), SIP, Ethernet, Asynchronous Transfer Mode (ATM), and frame relay (FR). Suitable intermediate nodes that may be used with the present invention include the Cisco 7200 Series Routers and the Cisco 7600 Series Routers available from Cisco Systems Inc.

The backplane 330 comprises point-to-point interconnections that interconnect the various cards and allow data and signals to be transferred between the cards. The line cards 310 connect (interface) the intermediate node 300 with the network 100 and enable the intermediate node 300 to transfer and acquire information (e.g., data packets) to and from the network via ports using various protocols such as, e.g., ATM, Ethernet, and FR. To that end, the line cards 310 comprise conventional interface circuitry that incorporates signal, electrical and mechanical characteristics, and interchange circuits, needed to interface with the physical media of the network 100 and protocols running over that media.

Functionally, the line cards 310 acquire information from the network 100 via the ports and forward the information to the backplane 330 as well as transfer information acquired from the backplane 330 to the network 100 via the ports. The ports may be conventional ports, such as, e.g., ATM, Ethernet and FR ports.

Figure 4:
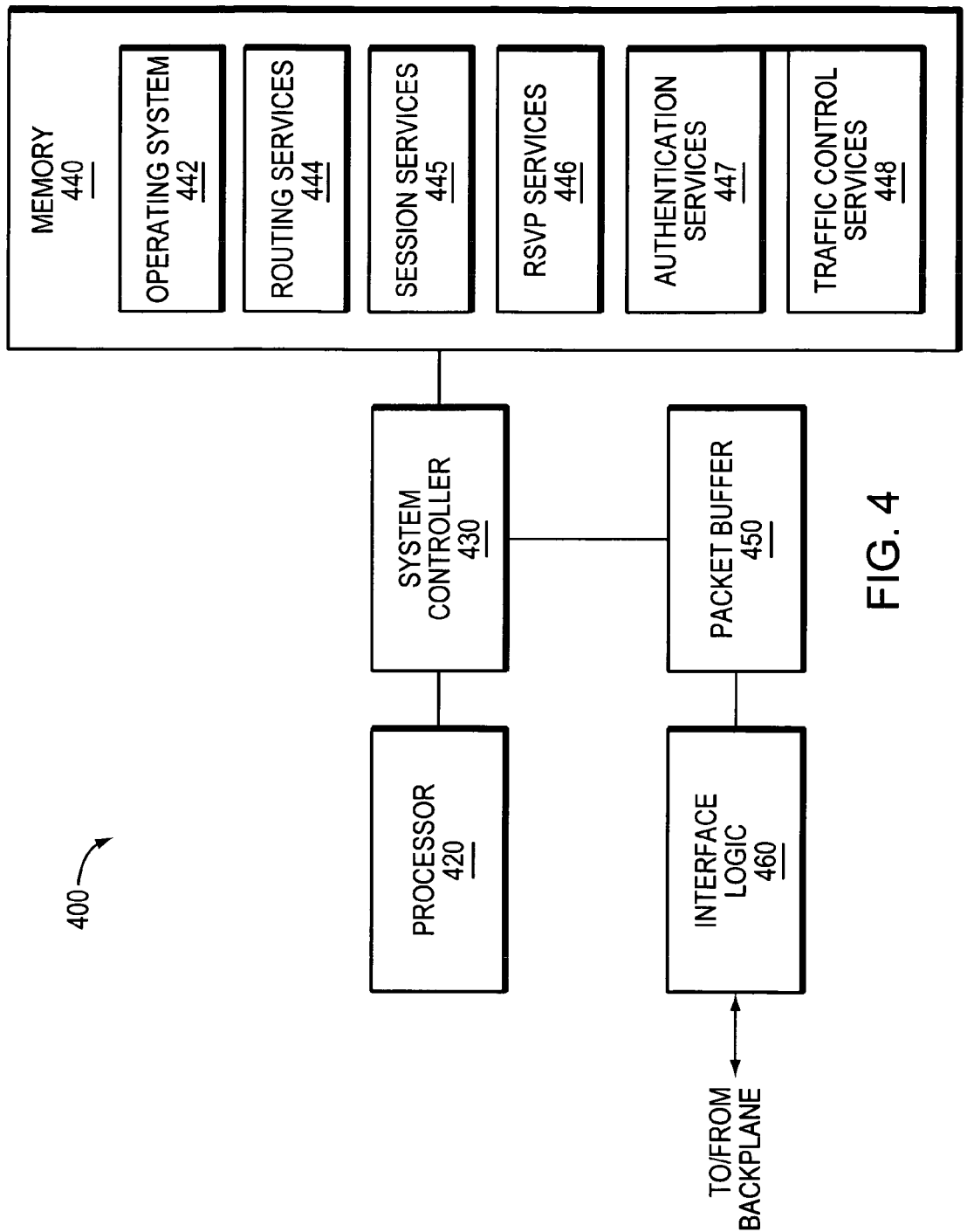
FIG. 4 is a high-level block diagram of a routing engine that may be used with the present invention.

The routing engine 400 comprises logic that is configured to manage node 300, execute various protocols, such as RSVP and SIP, and perform other functions including, processing SIP and RSVP messages in accordance with an aspect of the present invention. FIG. 4 is a high-level block diagram of a routing engine 400 that may be used with the present invention.

Routing engine 400 comprises interface logic 460, packet buffer 450, system controller 430, processor 420 and memory 440. Interface logic 460 is coupled to the backplane 330, and is configured to transfer information (e.g., data) between the backplane 330 and the routing engine 400. Packet buffer 450 is a memory comprising high-speed RAM devices capable of storing information acquired by the interface logic 460 and processed by the processor 420. System controller 430 is coupled to the processor 420, memory 440 and packet buffer 450 and comprises circuitry configured to enable the processor 420 to access (e.g., read, write) memory locations contained in the memory 440 and the packet buffer 450. Processor 420 is a conventional CPU configured to execute instructions contained in memory 440 for performing various functions in accordance with aspects of the present invention.

The memory 440 is a computer-readable medium comprising RAM devices, such as DRAM devices. Memory 440 contains various software and data structures used by processor 420 including operating system 442, routing services 444, session services 445, RSVP services 446, authentication services 447 and traffic control services 448. The operating system 442 functionally organizes the intermediate node 300 by invoking operations in support of software processes and services executing on the routing engine 400, such as routing services 444, session services 445, RSVP services 446, authentication services 447 and traffic control services 448. These services and processes may be configured to implement various routing and switching protocols supported by the intermediate node 300 as well as aspects of the present invention.

Routing services 444 is configured to implement various routing protocols, such as OSPF and IS-IS. These protocols are configured to manage a forwarding database (FDB) (not shown) containing, e.g., data used to make forwarding decisions. Session services 445 is configured to implement various services and protocols that are configured to establish and maintain sessions in accordance with the SIP protocol. The authentication services 447 is configured to implement a policy decision point (PDP) that authenticates entities, e.g., communication units 110 and users, associated with network 100. RSVP services 446 and traffic control services 448 are configured to implement various aspects of the RSVP protocol as well as aspects of the present invention. These services 446, 448 are described in more detail further below.

It should be noted that functions performed by call manager node 200 and intermediate node 300, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a communication network.

RSVP enables RSVP sessions to be established between a sender and a receiver of a data flow. In accordance with RSVP, RSVP Path messages are used by the sender to indicate its presence as well as specify resources needed to accommodate the data flow between the sender and the receiver. Further, in accordance with an aspect of the present invention, Path messages may contain an authentication object that e.g., provides an authentication of the sender.

Figure 5:
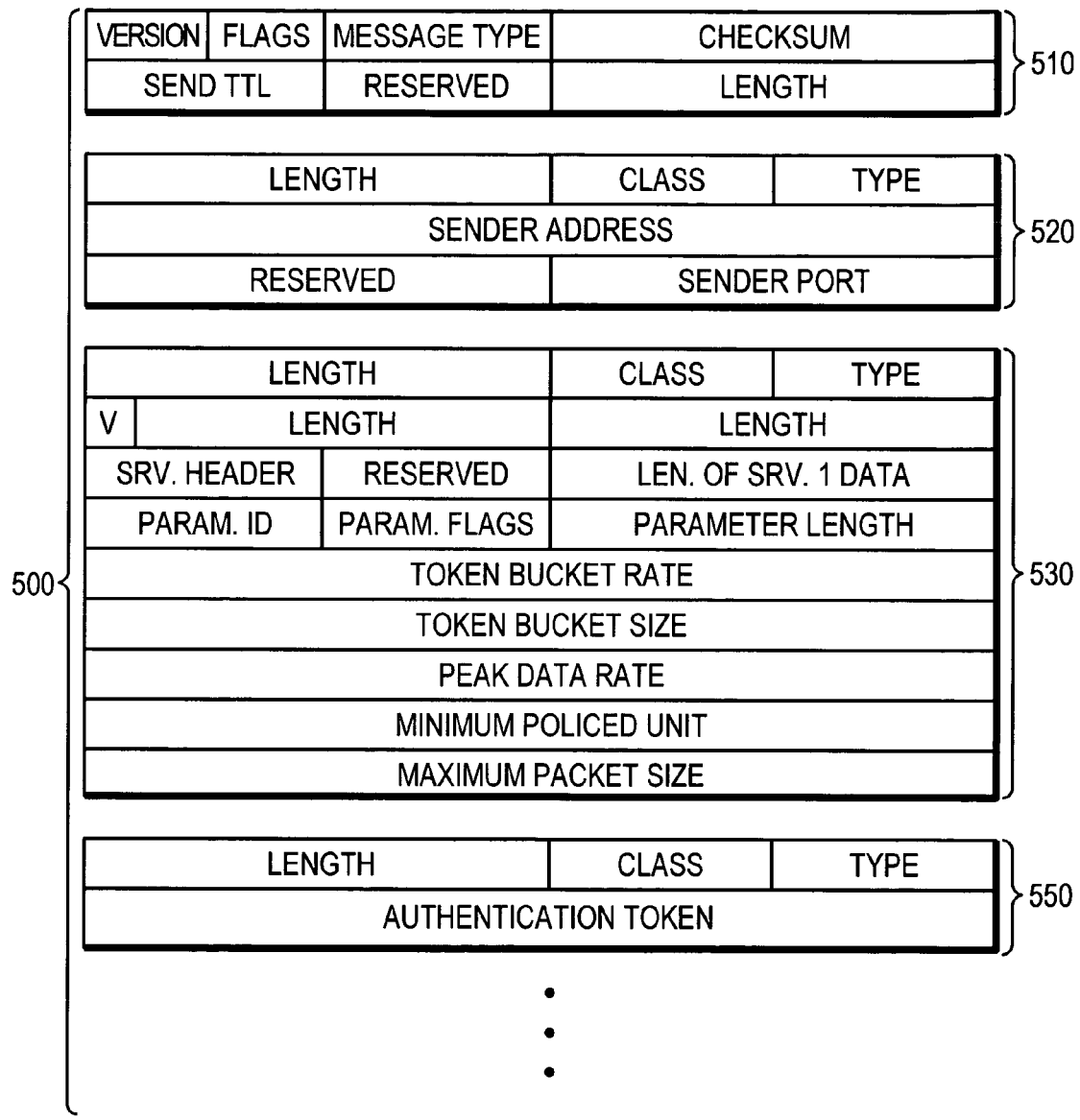
FIG. 5 illustrates a path message that may be used with the present invention.

FIG. 5 is a block diagram of an RSVP Path message 500 that may be advantageously used with the present invention. Message 500 comprises a common header 510, a sender template object 520, a traffic specification (Tspec) object 530 and an authentication object 550. It should be noted that message 500 may contain other objects, such as an Adspec object and a previous hop object.

The header 510 contains information about the message 500 including a version field, a flags field, a message type field, a checksum field, a send "time-to-live" (TTL) field and a length field. The version field holds a value that identifies a version of RSVP associated with the message 500. The flags field holds flags associated with the message 500. The message type field holds an identifier (ID) that identifies the message 500 as an RSVP Path message. The checksum field holds a value that represents a checksum associated with the message 500. The send TTL field holds a value that represents a "time-to-live" value for the message 500 and the length field holds a value that represents a length of the message 500, illustratively in bytes.

The sender template object 520 holds information about the sender. Object 520 comprises an object header, a sender address and a sender port. The object header further comprises length, class and type fields. The length field holds a value that represents a length of the object 520, illustratively in bytes. The class field holds a value that identifies the object 520 as belonging to the RSVP SENDER_TEMPLATE class. The type field holds a value that indicates a type object within the object's class, such as an IP version 4 (IPv4) type object or an IP version 6 (IPv6) type object. The sender address field holds a value that represents an address (e.g., IPv4 address, IPv6 address) associated with the sender and the sender port field holds a value that represents a port (e.g., IPv4 port, IPv6 port) associated with the sender.

The Tspec object 530 holds information about traffic parameters associated with the data flow and includes an object header and various traffic parameters. The object header holds information similar to the object header described above except that the class field holds a value that indicates the object 530 is in the RSVP SENDER_TSPEC class and the type field holds a value that indicates the type of object within this class. The traffic parameters may include parameters defined in various well-known "int-serv" working group documents, such as S. Shenker, et al., "General Characterization Parameters for Integrated Service Elements," RFC 2215, available from the IETF and which is hereby incorporated by reference as though fully set forth herein.

The authentication object 550 illustratively contains an object header and an authentication token. The object header holds information similar to the object headers described above except that the class field holds a value that indicates the object 530 is in an RSVP RSVP_AUTH class and the type field holds a value that indicates a type of object within this class. The authentication token field holds a value that represents a security token associated with the sender. As will be described further below, the security token is associated with an assertion that is returned from an authentication authority when authenticating the sender and represents an authentication of the sender.

In accordance with RSVP, a receiver establishes a new reservation for resources for a data flow between a sender and a receiver by responding to the sender's Path message with a reservation request (Resv) message. The Resv message travels upstream hop-by-hop along the path used by the Path message from the receiver to the sender. The Resv message contains information that is used by intermediate nodes along the path to reserve resources for the data flow.

Figure 6:
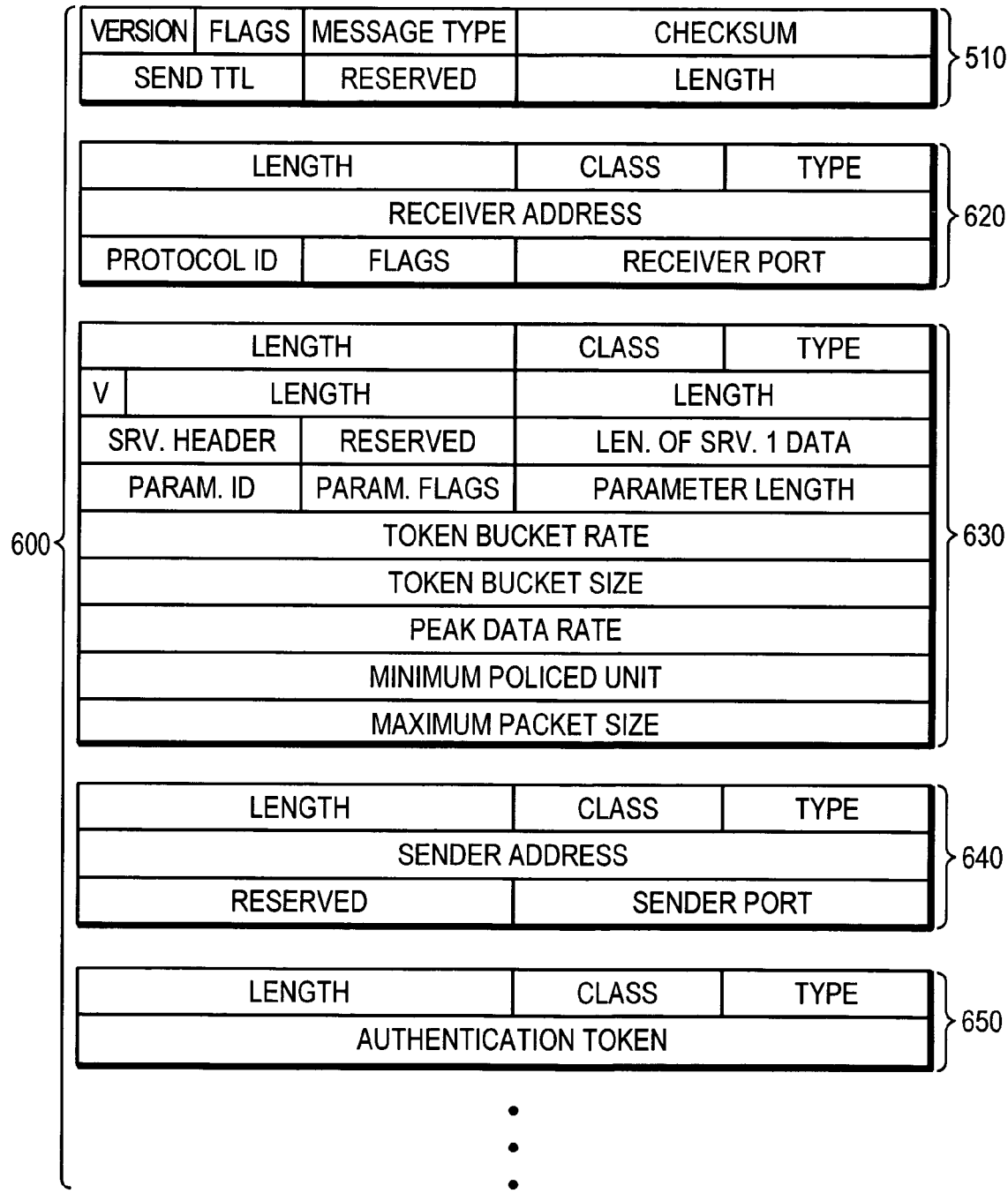
FIG. 6 illustrates a reservation request message that may be used with the present invention.

FIG. 6 illustrates a reservation request message 600 that may be used with the present invention. Message 600 is illustratively an RSVP Resv message comprising a common header 510, a session object 620, a flow specification (flowspec) object 630, a filter specification (filter spec) object 640 and an authorization object 650. It should be noted that the Resv message may contain other objects, such an integrity object and/or a reservation confirmation object.

The common header 510 contains information similar to the common header object described above except that the message type field contains a value that identifies the message as a Resv message. The session object 620 defines a session specification for the data flow for which resources are being reserved. Specifically, the session object 620 contains an object header having length, class and type fields, a receiver address field, a protocol ID field, a flags field and a receiver port field. The object header contains information similar to the object headers described above except that the class field holds a value that identifies the session object 620 as belonging to the RSVP SESSION class and the type field holds a value that indicates a type of the object (e.g., IPv4 session object, IPv6 session object) within the class. The receiver address and receiver port fields hold an address (e.g., IP address) and a port (e.g., IP port), respectively, that are associated with the data flow's receiver. The protocol ID field holds an identifier that identifies a protocol associated with the data flow and the flags field holds various flags associated with the data flow.

The flowspec object 630 contains information that defines various traffic characteristics associated with the new reservation. Specifically, the flowspec object 630 contains an object header, comprising length, class and type fields, and various traffic parameters. The object header holds information similar to the object headers described above except that the class field holds a value that indicates the object 630 belongs to the RSVP FLOW_SPEC class and the type field holds a value that indicates a type of object within the class. The traffic parameters may include parameters defined in various "int-serv" working group documents, such as parameters described in previously incorporated RFC 2215.

The filter spec object 640 contains information related to the sender. Specifically, the filter spec object 640 contains an object header, a sender address field and a sender port field. The object header holds information similar to the object headers described above except that the class field holds a value that indicates the object belongs to the RSVP FILTER_SPEC class and the type field holds a value that indicates a type of address (e.g., IPv4, IPv6) in the sender address and port fields. The sender address and sender port fields hold an address and port, respectively, of the data flow's sender.

The authentication object 650 contains information similar to the authentication object described above except that the authentication token field holds a value that represents a security token associated with the receiver. As will be described further below, the security token is associated with an assertion that is returned from an authentication authority when authenticating the receiver and represents an authentication of the receiver.

Figure 7:
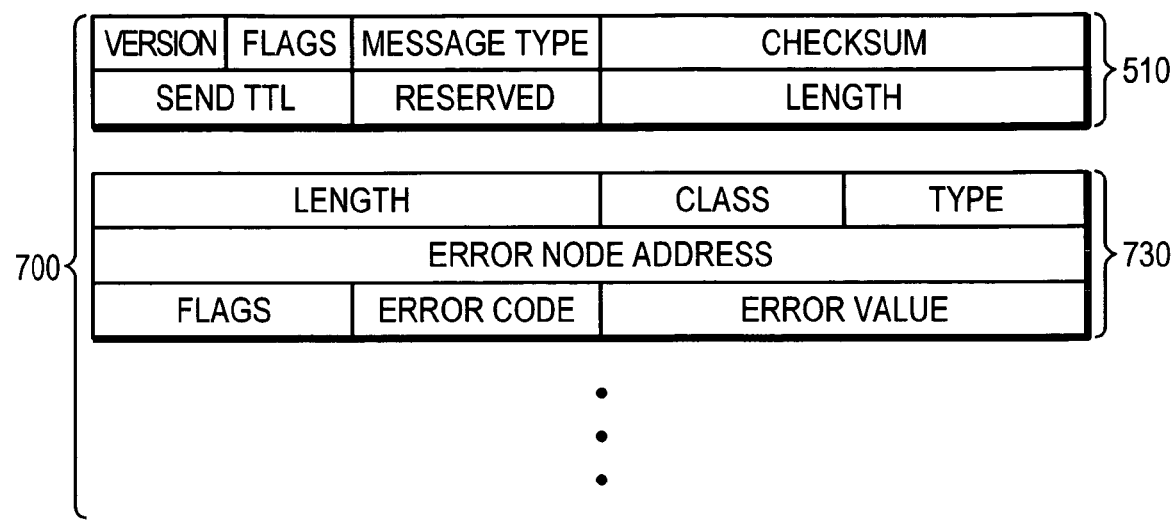
FIG. 7 illustrates a reservation error message that may be used with the present invention.

In communication network 100, error messages are used to disseminate information about error conditions associated with reservations. FIG. 7 illustrates an error message 700 that may be used with the present invention. Message 700 comprises a common header object 510 and an error specification (error spec) object 730. It should be noted that message 700 may contain other objects, such as session objects, filter spec objects, flow spec objects and policy data objects as described in S. Herzog, "RSVP Extensions for Policy Control," RFC 2750, available from the IETF, and is incorporated by reference herein in its entirety.

The common header object 510 contains information, similar to the common object headers described above, except the message type field holds a value that identifies the message as either a ResvErr or PathErr message, depending on whether the error message relates to an associated Resv or Path message, respectively. The error spec object 730 contains an object header comprising length, class and type fields, an error node address field, a flags field, an error code field and an error value field. The object header holds information similar to the object headers described above except that the class field holds a value that indicates the object is in the RSVP ERROR SPEC class and the type field holds a value that indicates a type of address held in the error node address field (e.g., IPv4 address, IPv6 address). The error node address field holds a value that indicates an address of the node where the error condition was detected. The flags field holds various flag values. The error code and error value fields hold information that describes the error being reported by the error message 700.

In accordance with an aspect of the present invention, security tokens are carried in signaling messages used to reserve resources for a call between a calling party and a called party. The security tokens are illustratively acquired by the calling and called parties from an authentication service which is trusted by both parties. Further, the token is delivered to the calling and called parties in an assertion message that illustratively conforms to the Secure Assertion Markup Language (SAML). Aspects of SAML are described in "Assertions and Protocols for the OASIS Security Assertion Markup Language (SAML) V2.0," available from the Organization for the Advancement of Structured Informational Standards (OASIS), http://www.oasis.org and which is hereby incorporated by reference in its entirety as though fully set forth herein.

SAML is an extensible markup language (XML) based markup language for exchanging authentication and authorization information between entities. SAML may be used to accommodate single sign-on (SSO) solutions for entities in a communications network. SSO refers to a form of authentication that enables an entity (e.g., a user) to authenticate itself with a single trusted source and gain access to e.g., the resources in a communication network. SAML assumes that an entity requesting authentication has enrolled with at least one identity provider which is trusted by other entities in the network and provides authentication of the entity to these other entities.

In a typical authentication arrangement, an entity requests authentication from an identity provider, often called a policy decision point (PDP), in which the entity has enrolled. The entity provides the PDP with information that only the entity and PDP know, such as a password. The PDP verifies the entity's identity using this information and after the entity's identity is verified, provides an assertion containing e.g. a security token to the entity. The security token may then be used by the entity to indicate it has been authenticated to other entities in the network.

Figure 8:
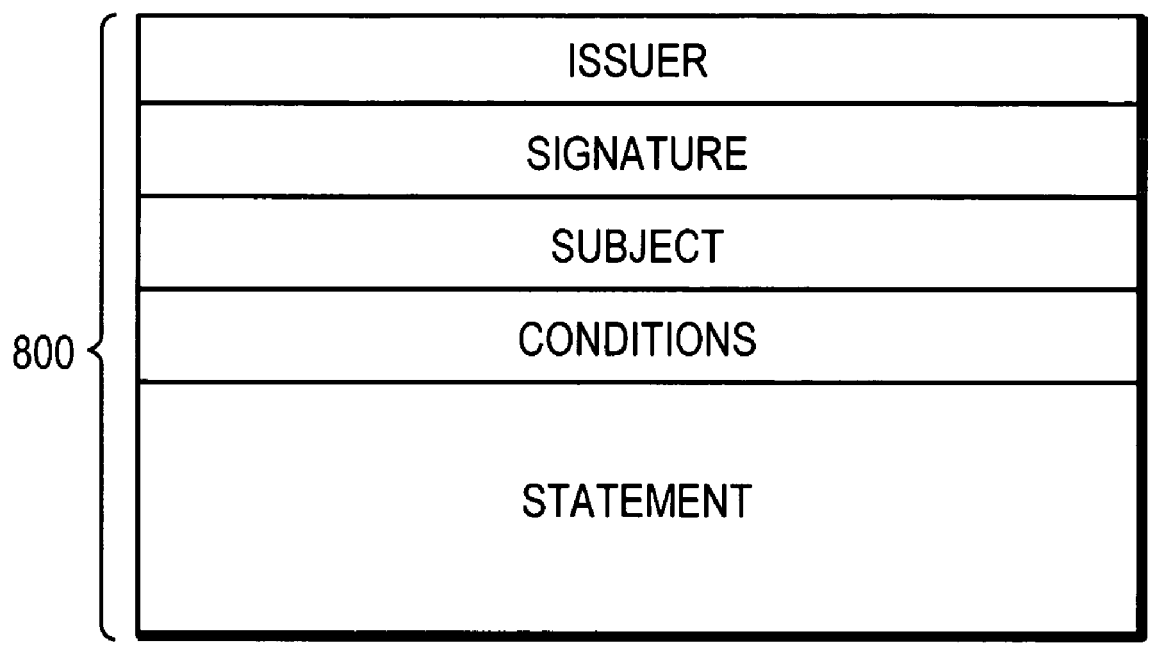
FIG. 8 illustrates an assertion that may be used with the present invention.

FIG. 8 is a block diagram of an assertion message 800 that may be used with the present invention. Assertion 800 is illustratively a SAML assertion comprising an issuer element, a signature element, a subject element, a condition element and a statement element. The issuer element contains information about the issuer of the assertion, such as a Universal Resource Locator (URL) associated with the PDP that issued the assertion. The signature element is a special digital signature that provides e.g., an authentication of the issuer of the assertion. The subject element describes subjects associated with the assertion, such as to how the entity was verified, name of the PDP and so on. The conditions element holds information about conditions under which the assertion is valid, such as a time frame for which the assertion is valid.

The statement element holds information that indicates the entity was indeed authenticated by the PDP. Illustratively, this information includes a security token that indicates the entity is authenticated.

Figure 9:
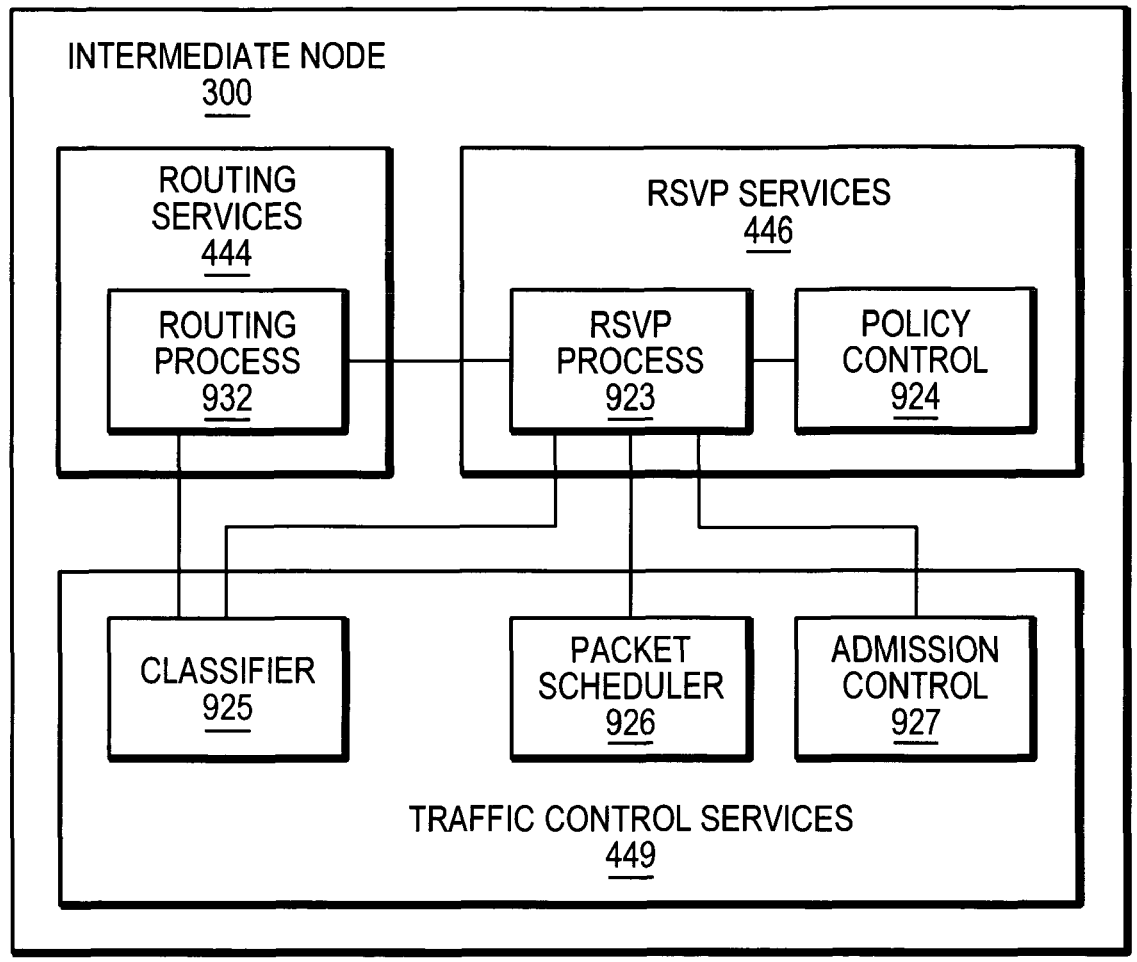
FIG. 9 is a high-level block diagram illustrating various functional blocks associated with the Resource Reservation Protocol (RSVP).

As noted above, intermediate node 300 contains various services including routing services 444, RSVP services 446 and traffic control services 448. The routing services 444 implement various conventional routing functions and the RSVP services 446 and traffic control services 448 implement various functions associated with RSVP. FIG. 9 illustrates these services in more detail.

The routing services 444 include a routing process 932 which performs various conventional routing functions, such as maintaining the FDB on intermediate node 300 and forwarding data packets handled by the intermediate node 300 at the L3 layer including data packets (e.g., messages) associated with RSVP. The routing process 932 may be configured to implement various conventional routing protocols, such as OSPF and IS-IS.

The RSVP services 446 comprise a policy control function 924 and an RSVP process 923. The policy control function 924 determines whether a particular requestor associated with a reservation request 600 has appropriate privileges to reserve resources on the intermediate node 300. The RSVP process 923 is configured to manage reservations and process messages (e.g., path messages, reservation request messages, error messages and reservation confirmation messages) associated with reservations in accordance with an aspect of the present invention.

Specifically, process 923 processes RSVP messages and maintains state (e.g., session tables) associated with reservations processed by the intermediate node 300. In addition, as will be described further below, process 923 is configured to (a) determine if an entity that is attempting to reserve resources on the intermediate node 300 has permission to do so, and (b) if so, reserve the resources for the entity, otherwise, (if the entity does not have permission), generate and forward an error message to the entity.

The traffic control services 448 comprise an admission control function 927, a packet scheduler 926 and a classifier 925. The admission control function 927 determines if the intermediate node 300 has sufficient resources to accommodate a particular request for resources specified in a reservation request message 600. The packet scheduler 926 and classifier 925 are configured to handle data packets associated with data flows which already have resources reserved on the intermediate node 300 and achieve a level of quality of service (QoS) for those data flows. Specifically, the packet classifier 925 determines QoS classes for data packets and the packet scheduler 926, and schedules the data packets for transfer from the intermediate node 300 according to each data packet's QoS class.

In accordance with RSVP, a flowspec object 630 in combination with a filter spec object 640 is often called a "flow descriptor." The flowspec 630 specifies a desired QoS and the filter spec 640 together with the session information, defines a set of data packets to receive the QoS specified in the flowspec. The flowspec 630 is used to set parameters in a packet scheduler 926 or other link layer mechanisms, while the filter spec 640 is used to set parameters in the packet classifier 925. Data packets that are addressed to a particular RSVP session but do not match any of the filter specs 640 for that RSVP session are handled as best-effort traffic.

Operationally, in accordance with an aspect of the present invention, a path message 500 issued by a sender is acquired by an intermediate node 300 in the path between the sender and a receiver. The message is forwarded to the intermediate node's RSVP process 923 by its routing services 444. The RSVP process 923 processes the path message 500 including directing the policy control 924 to determine if the sender that issued the message 600 has permission to make a reservation on the intermediate node 300. If the sender that issued the message 600 does not have permission to reserve resources on the intermediate node 300, an error message 700 is generated and forwarded to the sender, and the request is ignored; otherwise the message 500 is forwarded to the next node in the path.

Likewise, operationally, in accordance with an aspect of the present invention, a reservation request message 600 for a reservation is issued by a receiver, in response to a path message 500, and is eventually acquired by an intermediate node 300 in the path between the receiver and a sender. The message 600 is forwarded to the intermediate node's RSVP process 923 by its routing services 444. The RSVP process 923 processes the reservation request message 600 including directing the policy control 924 to determine if the receiver that issued the message 600 has permission to make a reservation on the intermediate node 300. If the receiver that issued the message 600 does not have permission to reserve resources on the intermediate node 300, an error message is generated and forwarded to the receiver, and the request is ignored.

Otherwise, the RSVP process 923 queries the admission control 927 to determine if sufficient resources are available on the intermediate node 300 for the reservation. If sufficient resources are available, various parameters are established in the packet classifier 925 and packet scheduler 926 to obtain a QoS requested by the message 600. If sufficient resources are not available, a check is performed to determine if one or more lower-priority reservations may be preempted to provide the resources. If so, the lower priority reservations are preempted and the resources are reallocated to the receiver. Otherwise, an error message 700 is generated and forwarded to the receiver.

Figure 10:
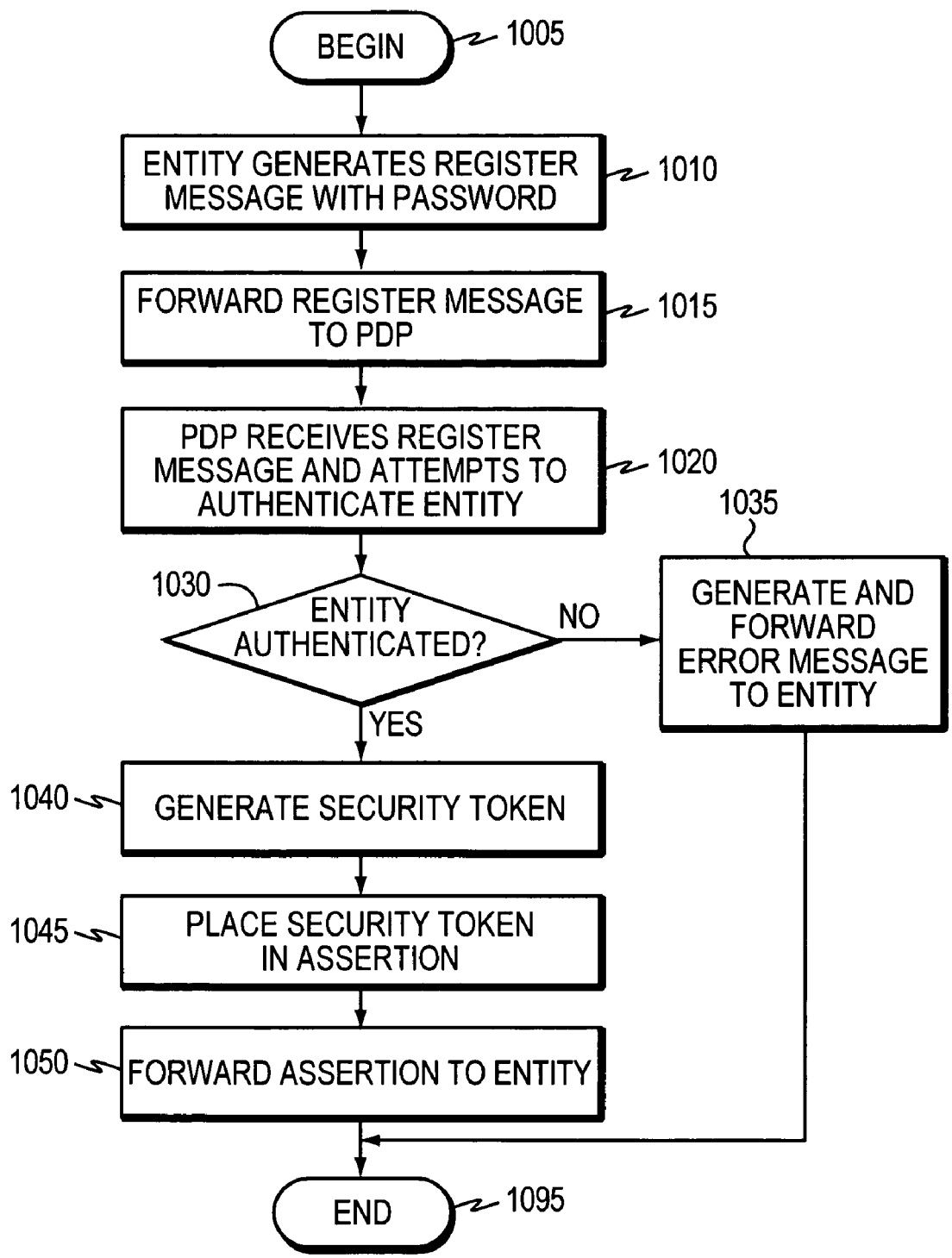
FIG. 10 is a flow chart of a sequence of steps that may be used to authenticate an entity and acquire a security token for the entity.

As noted above, entities (e.g., communication units 110) register with a PDP in order to attain a security token that they may use to reserve resources in the communication network 100. FIG. 10 is a flow chart of a sequence of steps that may be used to register with a PDP and acquire an access token. The sequence begins at step 1005 and proceeds to step 1010 where the entity registers with the PDP by generating a "register" message containing a password that is known by the entity and the PDP and forwarding the generated register message to the PDP (step 1015). Illustratively, the register message is a SIP register message. The PDP eventually receives the register message and attempts to authenticate the entity which may include verifying that the password contained in the register message is indeed the password associated with the entity (step 1020). Next, at step 1030, a check is performed to determine if the entity has been authenticated. If not, an error message is generated and forwarded to the entity (step 1035) and the sequence proceeds to step 1095. Otherwise, at step 1040, a security token is generated for the entity. Next, at step 1045, the generated security token is placed in an assertion, illustratively, by "wrapping" the token in a SAML assertion. The assertion is then returned to the entity (step 1050). The sequence ends at step 1095.

It should be noted that an entity may register with a PDP e.g., when the entity is first powered on, when the entity is a party to a call (as either the calling party or the called party), on a periodic basis or some combination thereof.

Figure 11:
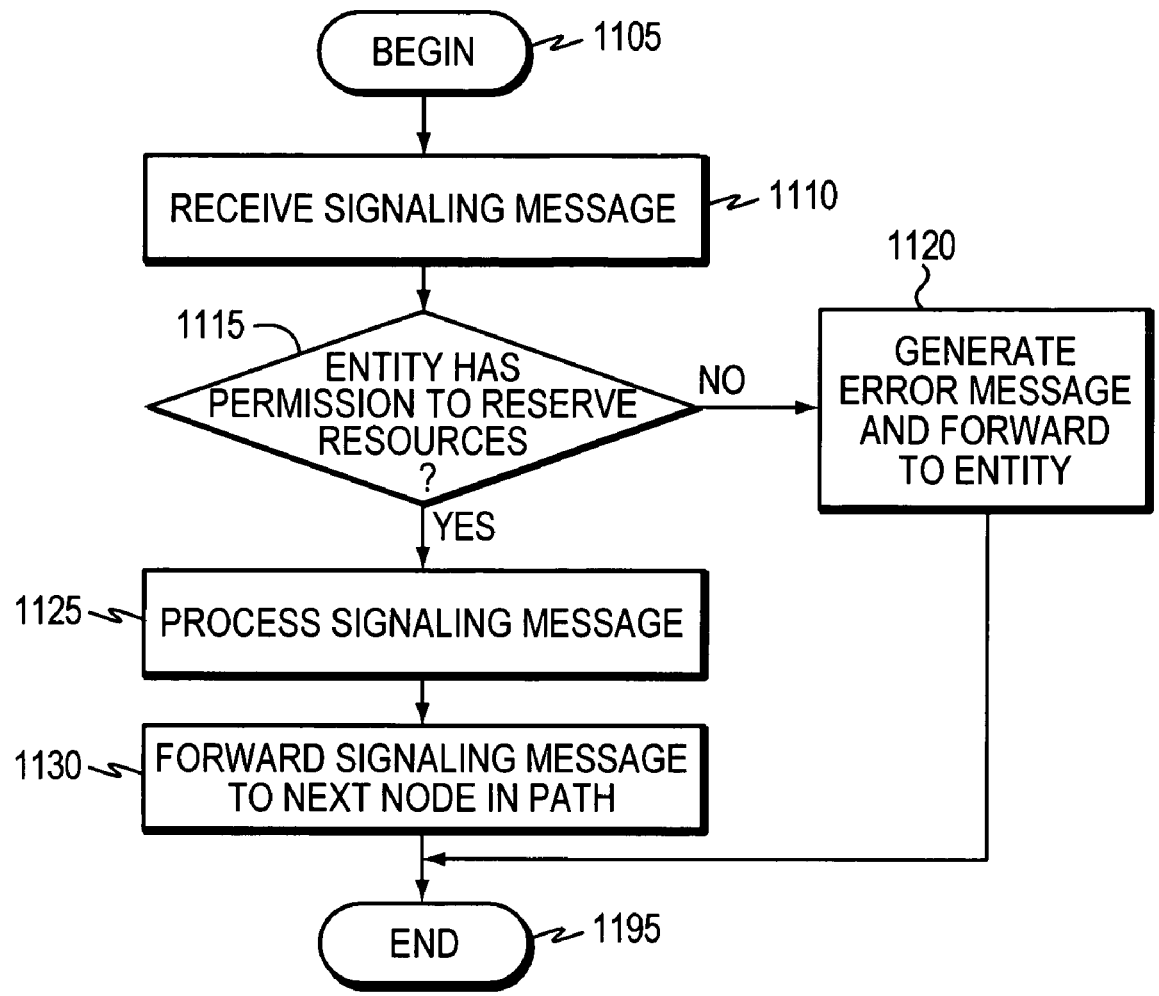
FIG. 11 is a flow chart of a sequence of steps that may be used to process a request to reserve resources for an entity in accordance with an aspect of the present invention.

In accordance with an aspect of the present invention, an intermediate node 300 that receives a resource reservation signaling message (e.g., path message 500, reservation request message 600), processes the message by determining if the entity (sender, receiver) associated with the message has permission to reserve resources on the intermediate node 300. If not, an error message is generated and forwarded to the entity; otherwise, resources are reserved for the entity and the message is forwarded to the next node in the network on a path, between a receiver and a sender, associated with the message. FIG. 11 is a flowchart of the sequence of steps that may be used to process a resource reservation signaling message transferred between a receiver and a sender in accordance with an aspect of the present invention.

The sequence begins at step 1105 and proceeds to step 1110 where the reservation request is received by a node on the path associated with the message. At step 1115, a check is performed to determine if an entity associated with the message has permission to reserve resources on the node. Illustratively, the entity associated with the message is the sender or receiver that generated the message. If not, an error message is generated, forwarded to the entity (step 1120) and the sequence proceeds to step 1195. Otherwise, at step 1125, the message is processed. This processing may include reserving resources specified in the reservation request on the node for the entity. Next, at step 1120, the request is forwarded to the next node in the path. The sequence ends at step 1195.

Figure 12:
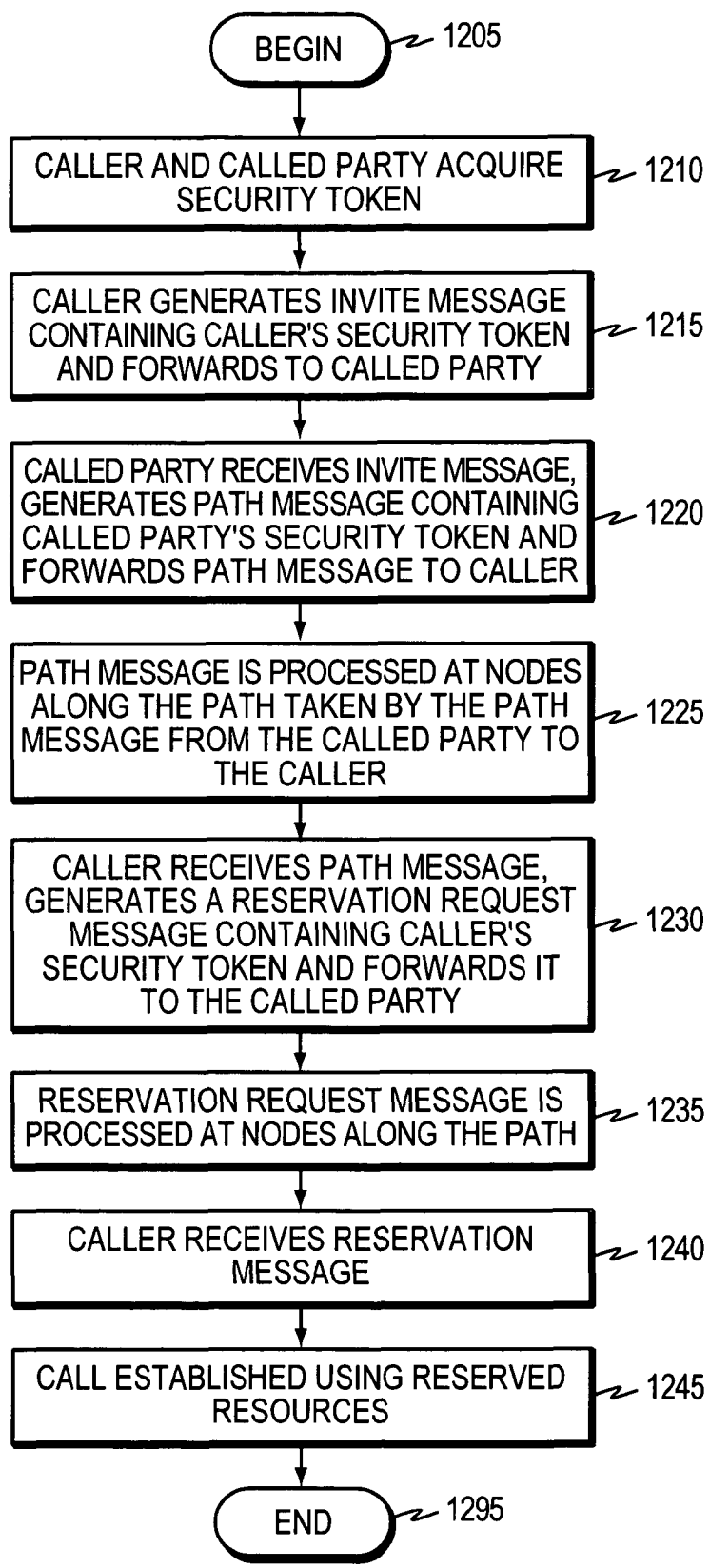
FIG. 12 is a flow chart of a sequence of steps that may be used to process a call from a calling party to a called party in accordance with an aspect of the present invention.

In accordance with an aspect of the present invention, calls may be established between entities in the network and resources for the calls are reserved using security tokens acquired by the entities. FIG. 12 is a flow chart of a sequence of steps that may be used to establish a call in a communication network in accordance with an aspect of the present invention.

The sequence begins at step 1205 and proceeds to step 1210 where both a calling and a called party acquire security tokens, as described above. Next, at step 1215, the calling party begins the call by generating and issuing an invite message containing the calling party's security token and forwards the invite message to the called party. At step 1220, the called party receives the invite message, and in response (a) generates a path message containing the called party security token and (b) forwards the path message to the calling party. Next, at step 1225, the path message is processed at nodes along a path taken by the path message from the called party to the calling party, as described above. Eventually, the calling party receives the path message and responds by generating and forwarding a reservation request message containing its security token to the called party (step 1230). At step 1235, the reservation request message is processed by nodes along the path between the calling party and the called party, as described above. The calling party eventually receives the reservation message (step 1240), and the call is established using the reserved resources in a conventional matter (step 1245). The sequence ends at step 1295.

For example, assume that a calling party at communication unit 110*a* wishes to place a call to a called party at communication unit 110*c*. Further, assume that intermediate node 300*a* is the PDP for communication units 110*a* and 110*b* and intermediate node 300*b* is the PDP for communication units 110*c* and 110*d*.

Now assume that the communication units 110*a* and 110*c* need to acquire security tokens to reserve resources for the call. Referring to FIG. 10, the communication units 110*a*, 110*c* generate register messages wherein the register messages contain a password associated with each communication unit (step 1010). The communication units 110*a*, 110*c* then forward the register messages to their respective PDPs, i.e., intermediate nodes 300*a* and 300*b*, respectively (step 1015). The PDPs receive the register messages and attempt to authenticate the identities of the communication units (step 1020). Specifically, at each PDP, the received register message is forwarded to the PDP's authentication services 477 which uses the password supplied in the register message to authenticate the communication unit 110 that generated the message. This may involve comparing the password with known passwords associated with the communication unit to determine if the password matches a known password and if so, considering the communication unit's identity authenticated. Assuming the communication units 110 are authenticated (step 1030), the PDPs generate security tokens (step 1040) and place the security tokens in, e.g., the statement elements of SAML assertions 800 (step 1045), and forward the assertions 800 to the respective communication units 110*a*, 110*c* (step 1050).

Now assume the calling party at communication unit 110*a* dials the number of communication unit 110*c* to reach the called party. Referring to FIG. 12, the calling party's communication unit 110*a* generates an invite message containing the calling party's security token and forwards it to the called party's communication unit 110*c* in a conventional manner (step 1215).

Eventually, communication unit 110*c* receives the invite message and in response (a) generates a path message 500 containing the called party's security token and (b) forwards the path message 500 to the calling party's communication unit 110*a*. The path message 500 is processed by intermediate nodes 300 along a path from the called party to the calling party (step 1225). Specifically, referring to FIG. 11, an intermediate node 300 on the path receives the path message 500 via a line card 310 (step 1110), forwards the message via the backplane 330 to the routing engine 400. The routing engine 400 receives the message 500 via its interface logic 460 and places the message in the packet buffer 450. The processor 420 processes the message 500 including determining if communication unit 110*c* has permission to reserve resources on the intermediate node 300 (step 1115). Illustratively, this verification may involve querying the intermediate node's policy control 924 to determine if the communication unit 110*a* has permission to reserve resources on the intermediate node 300. Assuming that communication unit 110*c* has permission to reserve resources on the intermediate node 300 (step 115), the path message 500 is further processed by the intermediate node 300 in a conventional manner (step 1125) and the path message 500 is forwarded to the next node in the path (step 1130).

Eventually, communication unit 110*a* receives the path message 500 and in response, (a) generates a reservation request message 600 containing an authorization object 550 wherein the authorization object's authorization token field contains the security token associated with the communication unit 110*a* and (b) forwards the generated message 600 to communication unit 110*c* (step 1230). The reservation request message 600 is processed at intermediate nodes 300 along the path between communication unit 110*a* and 110*c* (step 1235).

Specifically, referring again to FIG. 11, an intermediate node 300 receives the reservation request message 600 (step 1110) and uses the security token contained in the message 600 to determine if the calling party at communication unit 110*a* has permission to reserve resources on the intermediate node 300 (step 1115). Assuming the calling party has permission to reserve resources on the intermediate node 300, the intermediate node 300 processes the reservation message 600 (step 1125) including reserving the resources specified in the message 600 in a conventional manner (step 1125). The intermediate node 300 then forwards the reservation request message 600 to the next node in the path between communication unit 110*a* and 110*c* (step 1130).

Eventually communication unit 110*a* receives the reservation message 500 (step 1240) and the call is established between the communication units 110*a*, 110*c* in a conventional manner using the reserved resources (step 1245).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for reserving resources in a communication network for a call between a first entity and a second entity, the method comprising:
    acquiring a security token at the first entity prior to beginning setup of the call wherein the security token indicates the first entity is authenticated and authorized to establish and receive calls and to reserve resources in the communication network;
    generating a first signaling message at the application layer at the first entity for establishing the call with the second entity;
    placing the security token in the first signaling message;
    generating a second signaling message at the network layer at the first entity for reserving resources for the call in the communication network; wherein the second signaling message is a RSVP reservation request (Resv) message; and
    placing the security token in the second signaling message.

2. A method as defined in claim 1 further comprising:
    forwarding the first and second signaling messages onto the communication network to the second entity.

3. A method as defined in claim 1 wherein the second signaling message contains a data object that holds the security token.

4. A communication unit for reserving resources in a communication network for a call between a first entity and a second entity, the communication unit comprising:
    a network interface configured to receive an assertion message having a security token prior to beginning setup of the call wherein the security token indicates the first entity is authenticated and authorized to establish and receive calls and to reserve resources in the communication network; and
    a processor configured to:
        (a) generate a first signaling message at the application layer at the first entity for establishing the call with the second entity,
        (b) place the security token in the first signaling message,
        (c) generate a second signaling message at the network layer at the first entity for reserving resources for the call in the communication network, wherein the second signaling message is a RSVP reservation request (Resv) message, and
        place the security token in the second signaling message.

5. A communication unit as defined in claim 4 wherein the assertion message conforms to the Secure Assertion Markup Language (SAML).

6. A communication unit as defined in claim 4 wherein the network interface is further configured to transfer the first and second signaling messages onto the communication network.

7. A communication unit as defined in claim 4 wherein the second signaling message contains a data object that holds the security token.

8. An apparatus for reserving resources in a communication network for a call between a first entity and a second entity, the apparatus comprising:

means for receiving an assertion message having a security token prior to beginning setup of the call wherein the security token indicates the first entity is authenticated and authorized to establish and receive calls and to reserve resources in the communication network;

means for generating a first signaling message at the application layer at the first entity for establishing the call with the second entity;

means for placing the security token in the first signaling message;

means for generating a second signaling message at the network layer at the first entity for reserving resources for the call in the communication network; wherein the second signaling message is a RSVP reservation request (Resv) message; and means for placing the security token in the second signaling message.

* * * * *